US011944986B2

(12) United States Patent
Zheng et al.

(10) Patent No.: US 11,944,986 B2
(45) Date of Patent: Apr. 2, 2024

(54) DEVICE AND METHOD FOR REDUCING WIND RESISTANCE POWER OF LARGE GEOTECHNICAL CENTRIFUGE

(71) Applicant: ZHEJIANG UNIVERSITY, Zhejiang (CN)

(72) Inventors: Chuanxiang Zheng, Zhejiang (CN); Shuang Wei, Zhejiang (CN); Haifeng Zhou, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 874 days.

(21) Appl. No.: 16/961,696

(22) PCT Filed: Nov. 5, 2019

(86) PCT No.: PCT/CN2019/115619

§ 371 (c)(1),
(2) Date: Jul. 13, 2020

(87) PCT Pub. No.: WO2021/012464

PCT Pub. Date: Jan. 28, 2021

(65) Prior Publication Data

US 2021/0402418 A1 Dec. 30, 2021

(30) Foreign Application Priority Data

Jul. 19, 2019 (CN) ........................ 201910653484.2

(51) Int. Cl.
*B04B 15/02* (2006.01)
*B04B 3/00* (2006.01)
(Continued)

(52) U.S. Cl.
CPC ................ *B04B 15/02* (2013.01); *B04B 3/00* (2013.01); *B04B 7/06* (2013.01); *B04B 7/08* (2013.01); *B04B 15/08* (2013.01)

(58) Field of Classification Search
CPC .. B04B 15/02; B04B 3/00; B04B 7/06; B04B 7/08; B04B 15/08; B04B 7/00; G01M 99/008
See application file for complete search history.

(56) References Cited

U.S. PATENT DOCUMENTS 4,193,536 A * 3/1980 Kubota .................... B04B 9/04 494/20

FOREIGN PATENT DOCUMENTS

CN 108525868 A * 9/2018

* cited by examiner

*Primary Examiner* — Walter D. Griffin
*Assistant Examiner* — Shuyi S. Liu

(57) ABSTRACT

A device and a method for reducing wind resistance power of a large geotechnical centrifuge are provided. A semicircular tube cylindrical cooling device is provided between an internal side of a high-speed rotor system and a cylindrical shell. A serpentine top semicircular tube cooling plate is provided right above a hanging basket, and return helium gas inlet holes are provided at a center of the top semicircular tube cooling plate. A helium gas in a helium gas storage tank passes through helium gas outlets on the helium gas inlet pipes, and enters a centrifuge chamber from a bottom sealing plate. The helium gas is used to replace air in the centrifuge chamber to reduce the wind resistance power and corresponding energy consumption. No vacuuming is required, so sealing requirements are lower. Heat dissipation equipment is placed inside the centrifuge chamber, and a helium gas circulation wind duct is added.

8 Claims, 6 Drawing Sheets

(51) Int. Cl.

| | |
|---|---|
| ***B04B 7/06*** | (2006.01) |
| ***B04B 7/08*** | (2006.01) |
| ***B04B 15/08*** | (2006.01) |

DEVICE AND METHOD FOR REDUCING WIND RESISTANCE POWER OF LARGE GEOTECHNICAL CENTRIFUGE

BACKGROUND OF THE PRESENT INVENTION

Field of Invention

The present invention relates to a centrifuge technology for reducing wind resistance power, and more particularly to a device and a method for reducing wind resistance power of a large geotechnical centrifuge.

Description of Related Arts

Geotechnical centrifuge with large-diameter, high-acceleration, and hypergravity is an indispensable device for reproduction test of geological evolution process such as geotechnical evolution, geological structure evolution, and geological disaster reduction. As the acceleration g continues to increase, the wind resistance power of the centrifuge also increases sharply. According to the conventional method all over the world for estimating wind resistance power, the wind resistance power formula is $N_W=\rho A_1\omega^3B_1$, wherein $A_1$ and $B_1$ are coefficients related to shape and geometric size, respectively. The power $N_W$ is proportional to air density $\rho$ as well as to rotating speed $\omega^3$ of a high-speed rotor, so the greater the centrifugal acceleration is, the greater the wind resistance power will be. Finally, the wind resistance power will be converted into heat which increases the temperature in the centrifuge chamber. When the acceleration is below 500 g, the centrifuge can generally be cooled by an air-cooling unit or by natural air circulation. But when the acceleration increases to more than 1000 g, or even more than 1500 g, the heat produced in a centrifuge chamber with a diameter of 11 m can reach 10 MW, which is equivalent to a heat exchange of a large air-conditioning unit of 50,000 square meters. Such a huge heat exchange requires huge air volume, but excessive wind will affect the vibration of the rotating arm. As a result, conventional air-cooling can no longer meet the heat dissipation requirements of high-acceleration centrifuge. Without sufficient temperature control, all instruments in the centrifuge chamber will have problems. Generally, the temperature in the centrifuge chamber should be below 45° C.

From the wind resistance power formula, it can be seen that on machines of the same working conditions and geometric sizes, the effective way to reduce the wind resistance power is to reduce the air density. In conventional centrifuges with hypergravity acceleration of less than 500 g, direct air-cooling is generally combined with water-cooling around the centrifugal walls to control the temperature of the centrifuge. However, when the acceleration of the centrifuge or the rotor load is further increased, heat generated in the centrifuge chamber will be further increased. At this time, even the combination of the air-cooling and the water-cooling cannot satisfy the heat dissipation requirements. In order to solve this problem, the most effective method is to reduce the air density. A conventional method is to vacuum the centrifuge chamber to reduce the air density, thereby reducing friction and heat generation between the rotating arm and the air. However, vacuuming will cause other problems. First, air molecules are thin under vacuum, the heat transfer ability is also greatly reduced, and air convection is impossible under vacuum. As a result, the heat of the rotating arm caused by the friction between the rotating arm and the air cannot be effectively transferred. Second, bearings of the centrifuge will leak oil under high vacuum, and sealing around the centrifuge chamber becomes difficult, so the vacuum cannot be too high. Third, the vacuum also greatly increases the cost of the centrifuge chamber.

Conventionally, references related to heat dissipation in the test chamber of geotechnical centrifuges mainly include Chinese patent application CN201210056367.6 "Water-spray curtain cooling device for geotechnical centrifuge test chamber" by Liu Guogui, et al. of Zhejiang University, which disclosed a heat dissipation method with sufficient effect by spraying cooling water around the centrifuge chamber, but temperature control cannot be achieved by water cooling alone when the acceleration increases to more than 500 g; and Chinese patent application ZL201910350086.3 "Vacuum chamber structure of hypergravity geotechnical centrifuge" by Zheng Chuanxiang et al. of Zhejiang University, which vacuums the vacuum chamber to reduce the air density, and combines a built-in cooling system to control temperature; while such structure is very effective for geotechnical centrifuges of above 1000 g, it has never been reported to be used in geotechnical centrifuge of below 1000 g by domestic nor foreign literatures.

SUMMARY OF THE PRESENT INVENTION

In order to overcome the problems in the prior art, an object of the present invention is to provide a device and a method for reducing wind resistance power of a large geotechnical centrifuge, which use inject helium gas to replace air, so that gas density in a centrifuge chamber is greatly reduced, thereby reducing the wind resistance power. Meanwhile, a built-in heat dissipation technology is used to achieve an object of low energy consumption and highly reliable temperature control. The present invention can be mainly used in geotechnical centrifuges with acceleration of below 1500 g for reducing the wind resistance power, reducing the energy consumption, and controlling a temperature under a normal pressure.

From the wind resistance power formula, it can be seen that on machines of the same working conditions and geometric sizes, an effective way to reduce the wind resistance power is to reduce air density. The gas density of helium is 0.1785 kg/m$^3$ under the normal pressure, while the air density is 1.29 kg/m$^3$ under the normal pressure, which means the helium density is 13.84% of the air density. Therefore, in theory, the wind resistance power can be reduced by about 86%. After dramatic reduction of the wind resistance power, the temperature can be controlled under the normal pressure by combination of sidewall cooling and top cooling of the centrifuge chamber, thereby avoiding difficulties of temperature control by vacuuming.

Accordingly, in order to accomplish the above objects, the present invention provides:

I. A device for reducing wind resistance power of a large geotechnical centrifuge, comprising:

a cylindrical shell, a top sealing plate whose bottom is equipped with a top semicircular tube cooling plate, a bottom sealing plate, and a vibration isolation gasket, which all together form a sealed centrifuge chamber; wherein:

a high-speed rotor system is enclosed in the centrifuge chamber; a semicircular tube cylindrical cooling device is installed between an internal side of the cylindrical shell and the high-speed rotor system; a lower end of a main shaft of the high-speed rotor system extends out of the bottom sealing plate after passing through a bottom bearing sealing cover and a bottom bearing system, and then is sequentially connected to a coupling and a motor; the main shaft and the bottom bearing sealing cover are sealed by a main shaft dynamic seal; an upper end of the main shaft of the high-speed rotor system passes through the top semicircular tube cooling plate, the top sealing plate, a top bearing system and a top bearing sealing cover, and then is connected to an instrument compartment; the main shaft of the high-speed rotor system and the top sealing plate are sealed by another main shaft dynamic seal; the top bearing sealing cover and the bottom bearing sealing cover are fixed to respective bearing seats by bolts;

the top bearing system is located in a circular support ring of a top bearing system support device, and the circular support ring is rigidly connected to a connection pad through a plurality of top bearing support beams; the connection pad is fixed on side concrete;

each of two external ends of a centrifuge rotating arm of the high-speed rotor system is equipped with a hanging basket; the top semicircular tube cooling plate has a serpentine semicircular tube located right above the hanging basket; a plurality of top center return helium gas inlet holes are opened at a center of the top semicircular tube cooling plate;

a coolant inlet pipe, a coolant outlet pipe and a side door are provided on a sidewall of the cylindrical shell; the coolant inlet pipe communicates with an upper liquid collecting pipe; the upper liquid collecting pipe is connected through a coolant distribution tube to a top coolant inlet of the top semicircular tube cooling plate and a top liquid inlet of the semicircular tube cylindrical cooling device; the coolant outlet pipe communicates with a lower liquid collecting pipe; the lower liquid collecting pipe is connected through a coolant collecting pipe to a top coolant outlet of the top semicircular tube cooling plate and a bottom liquid outlet of the semicircular tube cylindrical cooling device; the upper liquid collecting pipe is installed on an upper liquid collecting pipe bracket, and the lower liquid collecting tube is installed on a lower liquid collecting tube bracket; a bottom end of the semicircular tube cylindrical cooling device is connected to a corner transition plate, and a bottom gap with a height of no more than 10 mm is reserved between the corner transition plate and the bottom sealing plate; a helium gas inside the centrifuge chamber passes through the bottom gap from a high wind pressure area at a bottom of the hanging basket, and then sequentially passes through an external side of the semicircular tube cylindrical cooling device and the top semicircular tube cooling plate; after heat exchange with the serpentine semicircular tube, the helium gas returns to the centrifuge chamber through the top center return helium gas inlet holes; after being mixed with a high is temperature helium gas, the helium gas is pushed to an inside of the semicircular tube cylindrical cooling device by a high-speed centrifuge rotor to complete a cycle;

a helium gas storage tank is connected to an automatic control valve through a pipe, and then connected to a plurality of helium gas inlet pipes through the pipe; after passing through the automatic control valve, the helium gas enters the centrifuge chamber through helium gas outlets on the helium gas inlet pipes.

An open end of the vibration isolation gasket is located in a groove on a top surface of a cylindrical shell flange, and is in close contact with the groove; the top surface of the vibration isolation gasket is in close contact with a bottom surface of the top sealing plate on the top bearing system support device; the vibration isolation gasket is higher than the top surface of the cylindrical shell flange; an inflation port is provided at a bottom portion of the groove on the top surface of the cylindrical shell flange, and compressed air increases a pressure in the open end of the vibration isolation gasket through the inflation port.

A lifting hole is opened on the top bearing system support device, and a top end of the lifting hole is sealed and covered by a lifting hole cover plate.

Top semicircular tube cooling plate is formed by several blocks, and each block of the top semicircular tube cooling plate is provided with a closed coolant circulation circuit formed by the top coolant inlet, the top coolant outlet and the serpentine semicircle tube.

The semicircular tube cylindrical cooling device comprises a plurality of arc-shaped cooling units which are assembled into a complete cylinder; each of the arc-shaped cooling units comprises an arc-shaped side plate, the serpentine semicircular tube welded to an external side of the arc-shaped side plate, the top liquid inlet, and the bottom liquid outlet, wherein a complete circulation circuit is formed from the top liquid inlet to the bottom liquid outlet; the top liquid inlet communicates with the upper liquid collecting pipe, and the bottom liquid outlet communicates with the lower liquid collecting tube.

The bottom sealing plate is welded or riveted to bottom concrete by a reinforcement pre-buried in the bottom concrete; a plurality of bottom exhaust pipes and a plurality of bottom exhaust pipe valves are provided at a bottom of the centrifuge chamber; the bottom exhaust pipes penetrate the bottom concrete and the bottom sealing plate.

The top bearing system is supported by the circular support ring and the top bearing support beams fixed on the circular support ring, and is connected to the connection pad; the connection pad is fixed on the side concrete; the top bearing support beams are symmetrically distributed.

Materials of the semicircular tube cylindrical cooling device and the top semicircular tube cooling plate are aluminum alloy, copper, stainless steel, or mild steel.

II. A method for reducing wind resistance power of a large geotechnical centrifuge, comprising steps of:

1) placing required experimental items in hanging baskets of a high-speed rotor, then closing all valves, a side door, and a lifting hole cover plate of an entire centrifuge chamber; and starting helium replacement;

2) opening an automatic control valve at an outlet of a helium gas storage tank, in such a manner that a pressurized helium gas evenly enters the centrifuge chamber from a bottom thereof through a helium gas inlet pipe, wherein due to a low density, the helium gas quickly rises to a top portion of the centrifuge chamber; opening bottom exhaust pipe valves, in such a manner that air is slowly discharged from the bottom due to a high density; monitoring the helium gas at outlets of the bottom exhaust pipe valves with a helium sensor, and determining whether the centrifuge chamber is full of the helium gas; and then closing the bottom exhaust pipe valves after the helium gas is fully injected;

3) turning on a liquid cooling system, opening inlet and outlet valves of an upper liquid collecting pipe and a lower liquid collecting pipe; turning on a freezer unit, and opening all valves of a semicircular tube cylindrical cooling device and a top semicircular tube cooling plate to activating a refrigeration system and the liquid cooling system; wherein after entering the centrifuge chamber from a coolant inlet pipe, a coolant passes through the upper liquid collecting pipe; one steam of the coolant exchanges heat with the top semicircular tube cooling plate before returning to the lower liquid collecting pipe, and then flows out from the coolant outlet pipe; the other steam of the coolant exchanges heat with the semicircular tube cylindrical cooling device before returning to the lower liquid collecting pipe, and then flows out from the coolant outlet pipe, thus completing a cycle;

4) turning on a main device of a hypergravity centrifuge to start working;

5) adjusting an output of a freezer to maintain a temperature in the centrifuge chamber at 20-45° C., when the temperature in the centrifuge chamber cavity rises to 40° C. and there is still an upward trend, reducing a centrifuge speed until shutdown; and 6) to stop a high-speed rotor system, first reducing a rotating speed and shutting down according to programs; then turning off the freezer, and turning off the semicircular tube cylindrical cooling device as well as the top semicircular tube cooling plate; opening the side door and a lifting hole to discharge the helium gas from the centrifuge chamber and let air enter; taking out the experimental items to complete an experiment.

Beneficial effects of the present invention are as follows:

1) The helium gas is used to replace the air in the closed centrifuge chamber of the large geotechnical centrifuge (according to the present invention, helium gas is used for replacement, but other injected gases can also be used). Because the density drops by 86%, the wind resistance power of the geotechnical centrifuge under the same working conditions and normal pressure can be reduced by 86%, which greatly reduces the wind resistance power and corresponding energy consumption. There is no such report at domestic nor abroad.

2) Compared with vacuuming to reduce the wind resistance power, the present invention does not require vacuuming, so the centrifuge chamber structure is simpler, and sealing requirements are lower. Large bearings will not leak oil due to vacuuming, and no huge energy-consuming vacuum system is required. The construction cost is greatly reduced, meanwhile the energy consumption required for vacuuming is no longer needed. As a result, operating cost is lowered and reliability is increased.

3) Heat dissipation equipment is arranged inside a vacuum chamber, and a helium gas circulation cooling wind duct is also provided, which can further improve heat exchange coefficient and increase heat dissipation effect. A huge wind pressure difference in the large geotechnical centrifuge is used to guide the high-temperature helium gas in the high wind pressure area into the semicircular tube cylindrical cooling device and a semicircular tube side of a top cooler. After heat exchange, the helium gas is sent to a central low-pressure area by a pressure difference, which takes full advantage of a cooling capacity of a cooling medium and greatly improves heat exchange efficiency.

4) Different from a cantilever beam rotor of a single-bearing system used in the conventional geotechnical centrifuge, the high-speed rotor of the present invention is provided with the top bearing system, which greatly increases the rigidity and operating stability of the high-speed rotor and solves the problem of vibration of the high-speed rotor.

5) The special vibration isolation gasket is used, in such a manner that the vibration transmitted to the top bearing system support device by the main shaft is separated from the centrifuge chamber, thereby avoiding resonance of the centrifuge chamber and the main shaft, and ensuring safety of the centrifuge chamber.

Therefore, the present invention is more economical when operating at an acceleration of below 1500 g, and can maintain the temperature below 45° C.

Figure 1:
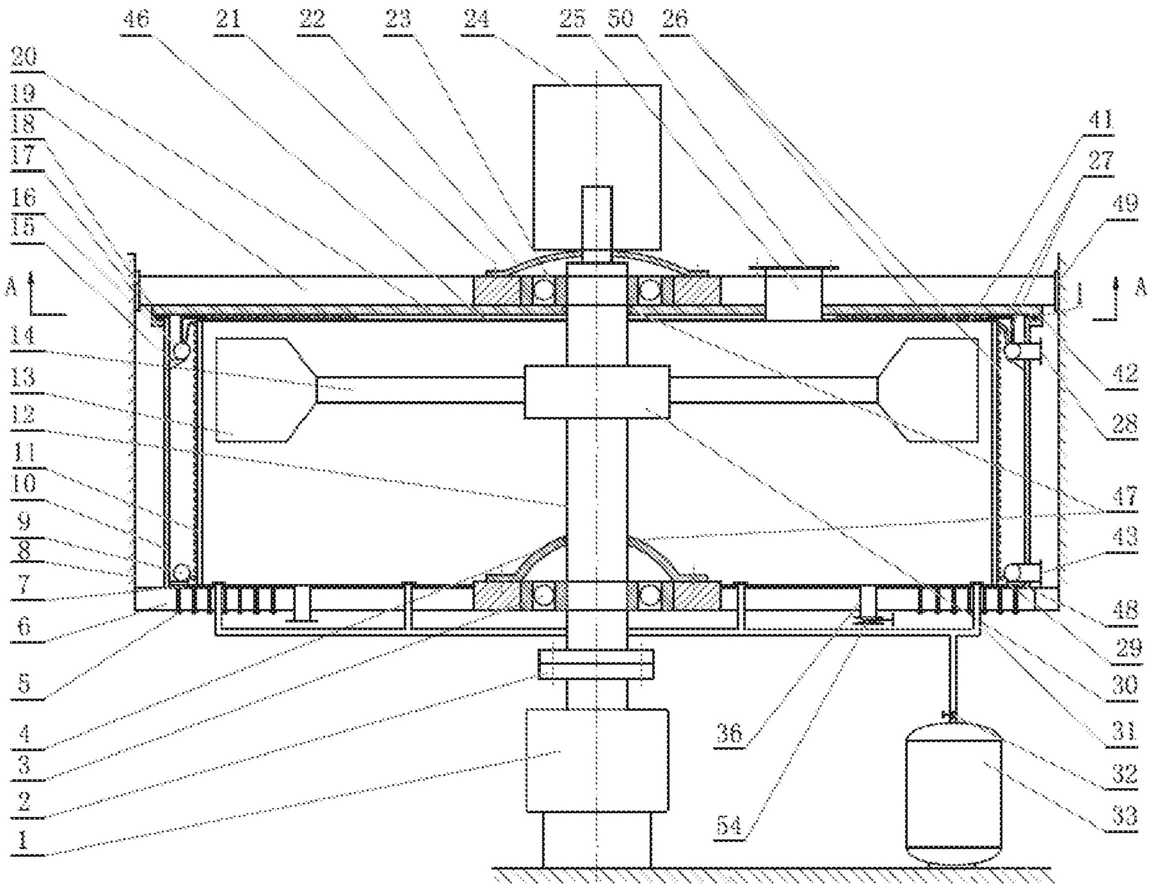
FIG. 1 is a front sectional view of the present invention.

Element reference: 1—motor, 2—coupling, 3—bottom bearing system, 4—bottom bearing sealing cover, 5—reinforcement bar, 6—bottom concrete, 7—bottom sealing plate, 8—side concrete, 9—lower liquid collecting pipe, 10—cylindrical shell, 11—semicircular tube cylindrical cooling device, 12—main shaft, 13—hanging basket, 14—centrifuge rotating arm, 15—upper liquid collecting pipe bracket, 16—upper liquid collecting pipe, 17—cylindrical shell flange, 18—vibration isolation gasket, 19—top bearing system support device, 20—top sealing plate, 21—bolt, 22—top bearing sealing cover, 23—top bearing system, 24—instrument compartment, 25—lifting hole, 26—serpentine semicircular tube, 27—coolant distribution tube, 28—coolant inlet pipe, 29—coolant collecting pipe, 30—high-speed rotor system, 31—helium gas inlet pipe, 32—automatic control valve, 33—helium gas storage tank, 34—top bearing support beam, 35—circular support ring, 36—bottom exhaust pipe, 37—side door, 38—helium gas outlet, 39—top coolant inlet, 40—top coolant outlet, 41—top semicircular tube cooling plate, 42—inflation port, 43—coolant outlet pipe, 44—corner transition plate, 45—bottom gap, 46—top center return helium gas inlet holes, 47—main shaft dynamic seal, 48—lower liquid collecting tube bracket, 49—connection pad, 50—lifting hole cover plate, 51—arc-shaped side plate, 52—top liquid outlet, 53—bottom liquid inlet, 54—bottom exhaust pipe valve.

DETAILED DESCRIPTION OF THE PREFERRED EMBODIMENT

Referring to the drawings, the present invention will be further illustrated.

Figure 2:
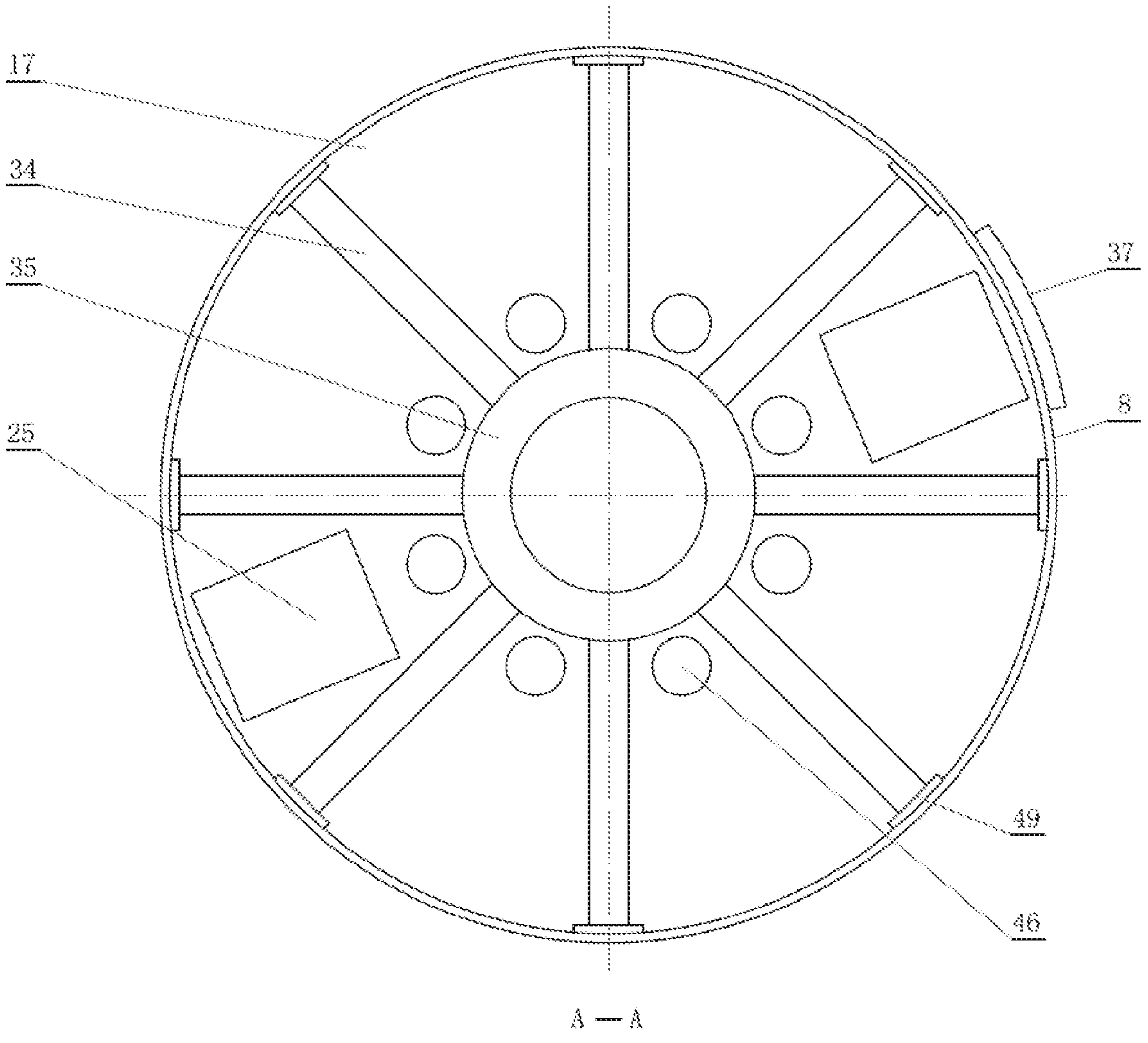
FIG. 2 is an A-A cross-sectional view of FIG. 1.

Referring to FIGS. 1 and 2, the present invention comprises a cylindrical shell 10, a top sealing plate 20 whose bottom is equipped with a top semicircular tube cooling plate 41, a bottom sealing plate 7, and a vibration isolation gasket 18, which all together form a sealed centrifuge chamber A high-speed rotor system 30 is enclosed in the centrifuge chamber; a semicircular tube cylindrical cooling device 11 is installed between an internal side of the cylindrical shell 10 and the high-speed rotor system 30; a lower end of a main shaft 12 of the high-speed rotor system 30 extends out of the bottom sealing plate 7 after passing through a bottom bearing sealing cover 4 and a bottom bearing system 3, and then is sequentially connected to a coupling 2 and a motor 1; the main shaft 12 and the bottom bearing sealing cover 4 are sealed by a main shaft dynamic seal; a top end of the main shaft 12 of the high-speed rotor system 30 passes through the top semicircular tube cooling plate 41, the top sealing plate 20, a top bearing system 23 and a top bearing sealing cover 22, and then is connected to an instrument compartment 24; the main shaft 12 of the high-speed rotor system 30 and the top sealing plate 20 are sealed by another main shaft dynamic seal; the top bearing sealing cover 22 and the bottom bearing sealing cover 4 are fixed to respective bearing seats by bolts 21.

The top bearing system 23 is located in a circular support ring 35 of a top bearing system support device 19, and the circular support ring 35 is rigidly connected to a connection pad 49 through a plurality of top bearing support beams 34; the connection pad 49 is fixed on side concrete 8.

Each of two external ends of a centrifuge rotating arm 14 of the high-speed rotor system 30 is equipped with a hanging basket 13; the top semicircular tube cooling plate 41 has a serpentine semicircular tube 26 located right above the hanging basket 13; a plurality of top center return helium gas inlet holes 46 are opened at a center of the top semicircular tube cooling plate 41.

Referring to FIGS. 1 and 2, a coolant inlet pipe 28, a coolant outlet pipe 43 and a side door 37 are provided on a sidewall of the cylindrical shell 10; the coolant inlet pipe 28 communicates with an upper liquid collecting pipe 16; the upper liquid collecting pipe 16 is connected through a coolant distribution tube 27 to a top coolant inlet 39 of the top semicircular tube cooling plate 41 and a bottom liquid inlet 53 of the semicircular tube cylindrical cooling device 11; the coolant outlet pipe 43 communicates with a lower liquid collecting pipe 9; the lower liquid collecting pipe 9 is connected through a coolant collecting pipe 29 to a top coolant outlet 40 of the top semicircular tube cooling plate 41 and a top liquid outlet 52 of the semicircular tube cylindrical cooling device 11; the upper liquid collecting pipe 16 is installed on an upper liquid collecting pipe bracket 15, and the lower liquid collecting tube 9 is installed on a lower liquid collecting tube bracket 48; after entering the centrifuge chamber from a coolant inlet pipe 28, a coolant passes through the upper liquid collecting pipe 16; one steam of the coolant exchanges heat with the top semicircular tube cooling plate 41 before returning to the lower liquid collecting pipe 9, and then flows out from the coolant outlet pipe 43; the other steam of the coolant exchanges heat with the semicircular tube cylindrical cooling device 11 before returning to the lower liquid collecting pipe 9, and then flows out from the coolant outlet pipe 43, thus completing a cycle.

Figure 6:
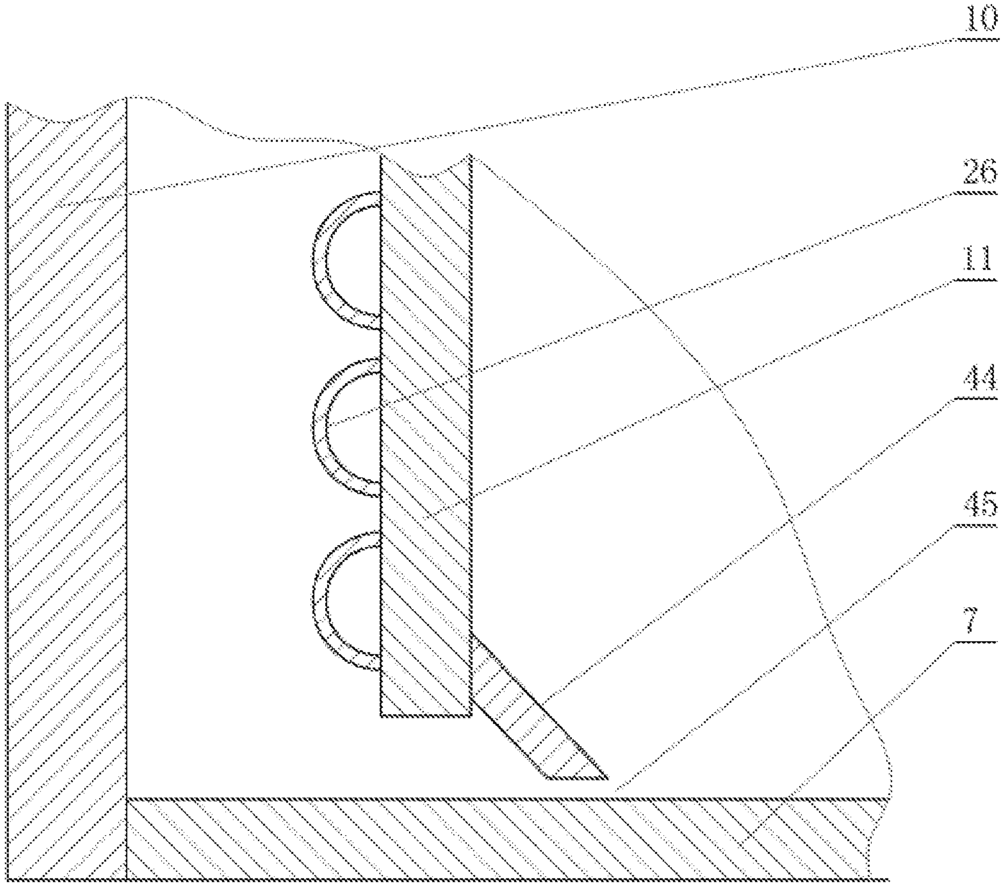
FIG. 6 is a sketch of a semicircular tube cylindrical cooling device unit.

Referring to FIG. 6, a bottom end of the semicircular tube cylindrical cooling device 11 is connected to a corner transition plate 44, and a bottom gap 45 with a height of no more than 10 mm is reserved between the corner transition plate 44 and the bottom sealing plate 7; a helium gas inside the centrifuge chamber passes through the bottom gap 45 from a high wind pressure area at a bottom of the hanging basket 13, and then sequentially passes through an external side of the semicircular tube cylindrical cooling device 11 and the top semicircular tube cooling plate 41; after heat exchange with the serpentine semicircular tube 26, the helium gas returns to the centrifuge chamber through the top center return helium gas inlet holes 46; after being mixed with a high temperature helium gas, the helium gas is pushed to an inside of the semicircular tube cylindrical cooling device 11 by a high-speed centrifuge rotor to complete a cycle.

Figure 4:
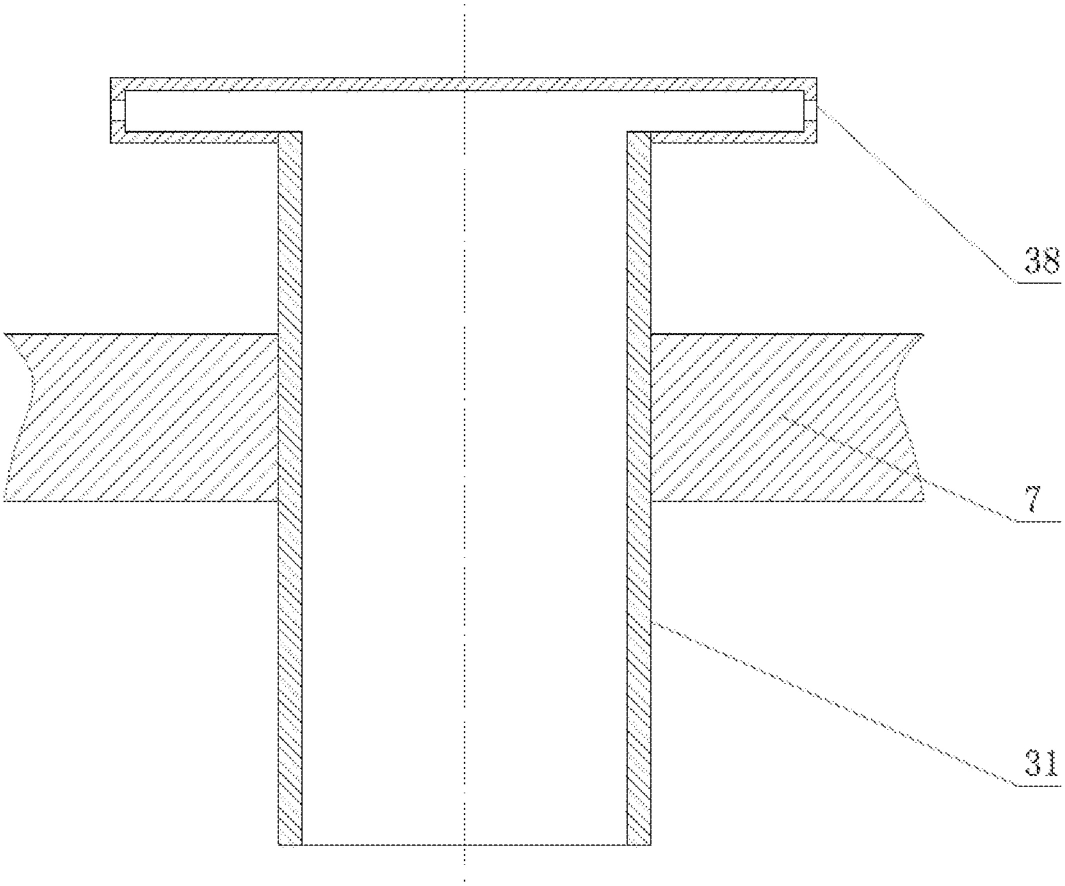
FIG. 4 illustrates a helium gas inlet device.

Referring to FIGS. 1 and 4, a helium gas storage tank 33 is connected to an automatic control valve 32 through a pipe, and then connected to a plurality of helium gas inlet pipes 31 through the pipe; after passing through the automatic control valve 32, the helium gas enters the centrifuge chamber through helium gas outlets 38 on the helium gas inlet pipes 31.

Figure 5:
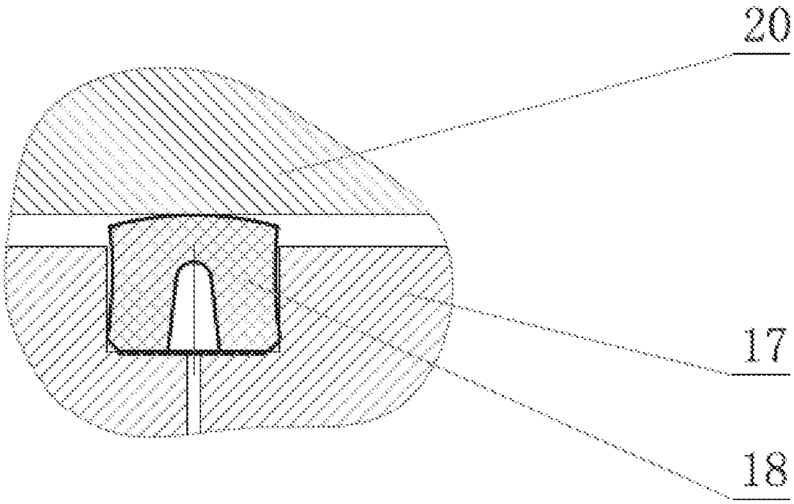
FIG. 5 is an enlarged view of a sealed anti-vibration structure I of FIG. 1.

Referring to FIGS. 1 and 5, an open end of the vibration isolation gasket 18 is located in a groove on a top surface of a cylindrical shell flange 17, and is in close contact with the groove; the top surface of the vibration isolation gasket 18 is in close contact with a bottom surface of the top sealing plate 20 on the top bearing system support device 19; the vibration isolation gasket 18 is higher than the top surface of the cylindrical shell flange 17 by at least 10 mm; an inflation port 42 is provided at a bottom portion of the groove on the top surface of the cylindrical shell flange 17, and compressed air increases a pressure in the open end of the vibration isolation gasket 18 through the inflation port 42.

Referring to FIGS. 1 and 2, a lifting hole 25 is drilled on the top bearing system support device 19, and a top end of the lifting hole 25 is sealed and covered by a lifting hole cover plate 50.

Figure 3:
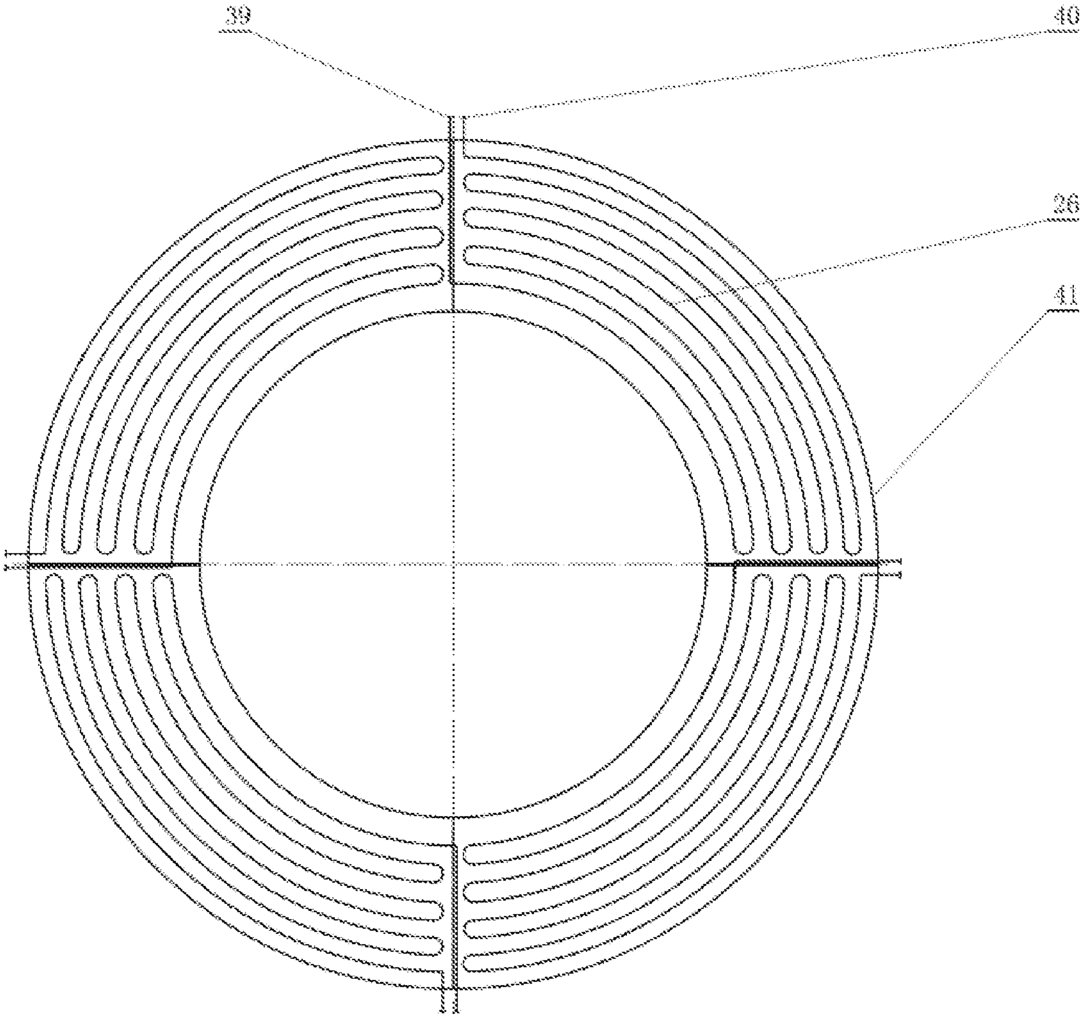
FIG. 3 is a structural view of a top semicircular tube cooling plate.

Referring to FIG. 3, the top semicircular tube cooling plate 41 is formed by blocks, and each of the blocks of the top semicircular tube cooling plate is provided with a closed coolant circulation circuit formed by the top coolant inlet 39, the top coolant outlet 40 and the serpentine semicircle tube 26.

Figure 7:
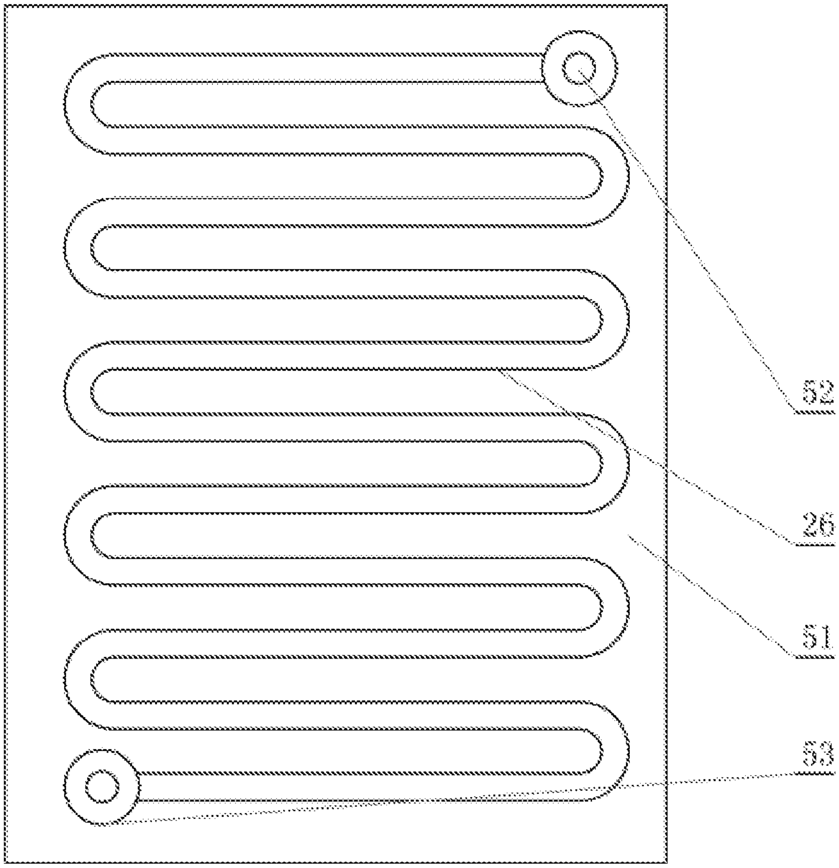
FIG. 7 is a top view of the semicircular tube cylindrical cooling device unit.
Figure 8:
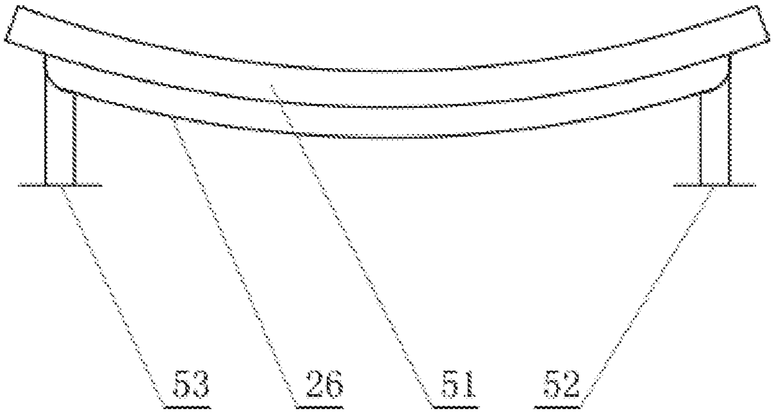
FIG. 8 is a partial enlarged view of a corner transition plate.

Referring to FIGS. 6-8, the semicircular tube cylindrical cooling device 11 comprises a plurality of arc-shaped cooling units which are assembled into a complete cylinder; each of the arc-shaped cooling units comprises an arc-shaped side plate 51, the serpentine semicircular tube 26 welded to an external side of the arc-shaped side plate 51, the top liquid inlet 52, and the bottom liquid outlet 53, wherein a complete circulation circuit is formed from the top liquid inlet 52 to the bottom liquid outlet 53; the top liquid inlet 52 communicates with the upper liquid collecting pipe 16, and the bottom liquid outlet 53 communicates with the lower liquid collecting tube 9.

The bottom sealing plate 7 is welded or riveted to bottom concrete 6 by a reinforcement 5 pre-buried in the bottom concrete 6; a plurality of bottom exhaust pipes 36 and a plurality of bottom exhaust pipe valves 54 are provided at a bottom of the centrifuge chamber; the bottom exhaust pipes 36 penetrate the bottom concrete 6 and the bottom sealing plate 7.

Referring to FIG. 2, the top bearing system 23 is supported by the circular support ring 35 and the top bearing support beams 34 fixed on the circular support ring 35, and is connected to the connection pad 49; the connection pad 49 is fixed on the side concrete 8; the top bearing support beams 34 are symmetrically distributed.

Materials of the semicircular tube cylindrical cooling device 11 and the top semicircular tube cooling plate 41 are aluminum alloy, copper, stainless steel, or mild steel.

A method of the present invention comprises steps of:

1) placing required experimental items in hanging baskets 13 of a high-speed rotor, then closing all valves, a side door, and a lifting hole cover plate of an entire centrifuge chamber; and starting helium replacement;

2) opening an automatic control valve 32 at an outlet of a helium gas storage tank 33, in such a manner that a pressurized helium gas evenly enters the centrifuge chamber from a bottom thereof through a helium gas inlet pipe 31, wherein due to a low density, the helium gas quickly rises to a top portion of the centrifuge chamber; opening bottom exhaust pipe valves 54, in such a manner that air is slowly discharged from the bottom due to a high density; monitoring the helium gas at outlets of the bottom exhaust pipe valves 54 with a helium sensor, and determining whether the centrifuge chamber is full of the helium gas; and then closing the bottom exhaust pipe valves 54 after the helium gas is fully injected;

3) turning on a liquid cooling system, opening inlet and outlet valves of an upper liquid collecting pipe 16 and a lower liquid collecting pipe 9; turning on a freezer unit, and opening all valves of a semicircular tube cylindrical cooling device 11 and a top semicircular tube cooling plate 41 to activating a refrigeration system and the liquid cooling system; wherein after entering the centrifuge chamber from a coolant inlet pipe 28, a coolant passes through the upper liquid collecting pipe 16; one steam of the coolant exchanges heat with the top semicircular tube cooling plate 41 before returning to the lower liquid collecting pipe 9, and then flows out from the coolant outlet pipe 43; the other steam of the coolant exchanges heat with the semicircular tube cylindrical cooling device 11 before returning to the lower liquid collecting pipe 9, and then flows out from the coolant outlet pipe 43, thus completing a cycle;

4) turning on a main device of a hypergravity centrifuge to start working;

5) adjusting an output of a freezer to maintain a temperature in the centrifuge chamber at 20-45° C., when the temperature in the centrifuge chamber cavity rises to 40° C. and there is still an upward trend, reducing a centrifuge speed until shutdown; and 6) to stop a high-speed rotor system, first reducing a rotating speed and shutting down according to programs; then turning off the freezer, and turning off the semicircular tube cylindrical cooling device 11 as well as the top semicircular tube cooling plate 41; opening the side door 27 and a lifting hole 25 to discharge the helium gas from the centrifuge chamber and let air enter; taking out the experimental items to complete an experiment.

What is claimed is:

1. A device for reducing wind resistance power, comprising: a cylindrical shell (10), a top sealing plate (20) whose bottom is equipped with a top semicircular tube cooling plate (41), a bottom sealing plate (7), and a vibration isolation gasket (18), which all together form a centrifuge chamber; wherein:

a high-speed rotor system (30) is enclosed in the centrifuge chamber; a semicircular tube cylindrical cooling device (11) is installed between an internal side of the cylindrical shell (10) and the high-speed rotor system (30); a bottom end of a main shaft (12) of the high-speed rotor system (30) extends out of the bottom sealing plate (7) after passing through a bottom bearing sealing cover (4) and a bottom bearing system (3), and then is sequentially connected to a coupling (2) and a motor (1); the main shaft (12) and the bottom bearing sealing cover (4) are sealed by a main shaft dynamic seal; an upper end of the main shaft (12) of the high-speed rotor system (30) passes through the top semicircular tube cooling plate (41), the top sealing plate (20), an top bearing system (23) and a top bearing sealing cover (22), and then is connected to an instrument compartment (24); the main shaft (12) of the high-speed rotor system (30) and the top sealing plate (20) are sealed by another main shaft dynamic seal; the top bearing sealing cover (22) and the bottom bearing sealing cover (4) are fixed to respective bearing seats by bolts (21);

the top bearing system (23) is located in a circular support ring (35) of a top bearing system support device (19), and the circular support ring (35) is rigidly connected to a connection pad (49) through a plurality of top bearing support beams (34); the connection pad (49) is fixed on side concrete (8);

each of two external ends of a centrifuge rotating arm (14) of the high-speed rotor system (30) is equipped with a hanging basket (13); the top semicircular tube cooling plate (41) has a serpentine semicircular tube (26) located right above the hanging basket (13); a plurality of top center return helium gas inlet holes (46) are provided at a center of the top semicircular tube cooling plate (41);

a coolant inlet pipe (28), a coolant outlet pipe (43) and a side door (37) are provided on a sidewall of the cylindrical shell (10); the coolant inlet pipe (28) communicates with an upper liquid collecting pipe (16); the upper liquid collecting pipe (16) is connected through a coolant distribution tube (27) to a top coolant inlet (39) of the top semicircular tube cooling plate (41) and atop liquid inlet (52) of the semicircular tube cylindrical cooling device (11); the coolant outlet pipe (43) communicates with a lower liquid collecting pipe (9); the lower liquid collecting pipe (9) is connected through a coolant collecting pipe (29) to a top coolant outlet (40) of the top semicircular tube cooling plate (41) and a bottom liquid outlet (53) of the semicircular tube cylindrical cooling device (11); the upper liquid collecting pipe (16) is installed on an upper liquid collecting pipe bracket (15), and the lower liquid collecting pipe (9) is installed on a lower liquid collecting pipe bracket (48);

a bottom end of the semicircular tube cylindrical cooling device (11) is connected to a corner transition plate (44), and a bottom gap (45) with a height of no more than 10 mm is reserved between the corner transition plate (44) and the bottom sealing plate (7); a helium gas inside the centrifuge chamber passes through the bottom gap (45) from a high wind pressure area at a bottom of the hanging basket (13), and then sequentially passes through the semicircular tube cylindrical cooling device (11) and the top semicircular tube cooling plate (41); after heat exchange with the serpentine semicircular tube (26), the helium gas returns to the centrifuge chamber through the top center return helium gas inlet holes (46); after being mixed with a high temperature helium gas, the helium gas is pushed into the semicircular tube cylindrical cooling device (11) by a high-speed centrifuge rotor to complete a cycle;

a helium gas storage tank (33) is connected to an automatic control valve (32) through a pipe, and then connected to a plurality of helium gas inlet pipes (31) through the pipe; after passing through the automatic control valve (32), the helium gas enters the centrifuge chamber through helium gas outlets (38) on the helium gas inlet pipes (31).

2. The device, as recited in claim 1, wherein an open end of the vibration isolation gasket (18) is located in a groove on atop surface of a cylindrical shell flange (17), and is in close contact with the groove; the top surface of the vibration isolation gasket (18) is in close contact with a bottom surface of the top sealing plate (20) on the top bearing system support device (19); the vibration isolation gasket (18) is higher than the top surface of the cylindrical shell flange (17); an inflation port (42) is provided at a bottom portion of the groove on the top surface of the cylindrical shell flange (17).

3. The device, as recited in claim 1, wherein a lifting hole (25) is drilled on the top bearing system support device (19), and a top end of the lifting hole (25) is sealed and covered by a lifting hole cover plate (50).

4. The device, as recited in claim 1, wherein the top semicircular tube cooling plate (41) is formed by several blocks, and each of the blocks of the top semicircular tube cooling plate is provided with a closed coolant circulation circuit formed by the top coolant inlet (39), the top coolant outlet (40) and the serpentine semicircle tube (26).

5. The device, as recited in claim 1, wherein the semicircular tube cylindrical cooling device (11) comprises a plurality of arc-shaped cooling units which are assembled into a complete cylinder; each of the arc-shaped cooling units comprises an arc-shaped side plate (51), the serpentine semicircular tube (26) welded to an external side of the arc-shaped side plate (51), the top liquid inlet (52), and the bottom liquid outlet (53), wherein a complete circulation circuit is formed from the top liquid inlet (52) to the bottom liquid outlet (53); the top liquid inlet (52) communicates with the upper liquid collecting pipe (16), and the bottom liquid outlet (53) communicates with the lower liquid collecting pipe (9).

6. The device, as recited in claim 1, wherein the bottom sealing plate (7) is welded or riveted to bottom concrete (6) by a reinforcement (5) pre-buried in the bottom concrete (6); a plurality of bottom exhaust pipes (36) and a plurality of bottom exhaust pipe valves (54) are provided at a bottom of the centrifuge chamber; the bottom exhaust pipes (36) penetrate the bottom concrete (6) and the bottom sealing plate (7).

7. The device, as recited in claim 1, wherein the top bearing system (23) is supported by the circular support ring (35) and the top bearing support beams (34) fixed on the circular support ring (35), and is connected to the connection pad (49); the connection pad (49) is fixed on the side concrete (8); the top bearing support beams (34) are symmetrically distributed.

8. The device, as recited in claim 1, wherein materials of the semicircular tube cylindrical cooling device (11) and the top semicircular tube cooling plate (41) are aluminum alloy, copper, stainless steel, or mild steel.

* * * * *